UNITED STATES PATENT OFFICE.

VICTOR DE KARAVODINE, OF BILLANCOURT, FRANCE, ASSIGNOR OF ONE-HALF TO SERGE BERDITSCHEWSKY APOSTOLOFF, OF LONDON, ENGLAND.

MANUFACTURE OF ELECTRODES FOR SECONDARY BATTERIES OR STORAGE-CELLS.

1,004,793.

Specification of Letters Patent.

Patented Oct. 3, 1911.

No Drawing.

Application filed October 5, 1910. Serial No. 585,394.

*To all whom it may concern:*

Be it known that I, VICTOR DE KARAVODINE, a subject of the Emperor of Russia, and resident of 11 Rue Theodore, Billancourt, Seine, France, have invented certain new and useful Improvements in the Manufacture of Electrodes for Secondary Batteries or Storage-Cells, of which the following is a specification.

This invention has for its object the production of plates or electrodes for secondary batteries or storage cells possessing to a marked extent the valuable qualities of large capacity per unit weight, combined with coherence of the active material and mechanical strength.

I have discovered a process by which the difficulty hitherto experienced in making use of lead sulfate for the production of such plates or electrodes may be overcome and whereby it is consequently made possible to employ lead sulfate alone as the source of the active material.

The process of this invention is as follows. The lead sulfate is brought to a thick pasty condition by the addition of ammoniacal liquor or solution, and before the paste dries is molded to the required shape; or the lead sulfate may be brought to a thick pasty condition with water, molded to shape and, before it is quite dry, exposed to the action of gaseous ammonia, or is immersed in a concentrated ammonia bath for about a quarter of an hour. The action of the ammonia results in the paste setting into a hard mass when dry.

It will be understood that the order of treatment of lead sulfate with water and ammonia is immaterial; the sulfate may be made into a paste with an ammoniacal solution, it may be made into a paste with water and subsequently exposed to ammonia gas or it may be made into a paste with water and subsequently immersed in a concentrated ammonia bath. In each case the process is a treatment with water and ammonia. The three methods are equivalent and are intended to be included by the phrase, "treating lead sulfate with water and ammonia", in the claims. The plates or masses of lead sulfate are thereafter immersed in a formation-bath constituted by a saturated solution of ammonium sulfate and a sufficient quantity of ammonia (say approximately 5%) to keep the bath in an alkaline condition, in which bath the lead sulfate is reduced to spongy lead in the usual manner with dummy plates by the passage of an electric current. During this operation care must be taken to preserve the bath in an alkaline condition by the addition, from time to time, of further quantities of ammonia. Such of the formed plates as are required for positive plates may be converted into peroxid plates in the usual manner. With a view of still further increasing the porosity of the mass, I may add to the lead sulfate, before it is made into a paste, a certain quantity of ammonium sulfate, the proportion in the case of the positive plates being 1 to 10% by weight, and in the case of the negative plates 5 to 30% by weight. The plastic material prior to hardening may be applied to a grid or other conductive support; or in lieu of employing a support of the usual type I may embed a conducting wire or skeleton in the mass before it has hardened. Moreover, since the masses of active material obtained by this process are coherent and self-supporting, the plates or electrodes may, if desired, be unprovided with any mechanical support.

Claims:

1. The process of making electrodes for secondary batteries which consists in treating lead sulfate with water and ammonia, and subjecting the product thus formed to electrolytic treatment in an alkaline bath.

2. The process of making electrodes for secondary batteries which consists in treating lead sulfate with water and ammonia, molding this mixture to the required shape, and subjecting it to the action of an electric current in an alkaline bath.

3. The process of making electrodes for secondary batteries which consists in treating lead sulfate with water and ammonia, molding the paste thus formed to the required shape and subjecting it to electrolytic treatment in an alkaline bath of ammonium sulfate and ammonia.

4. The process of making electrodes for secondary cells consisting in making a paste of lead sulfate, water and ammonia, forming this paste to the desired shape and converting it to spongy lead by electrolysis in a solution of ammonium sulfate maintained alkaline by ammonia.

5. The process of making electrodes for secondary cells which consists in treating lead sulfate with water and ammonia, subjecting the product thus formed to electrolytic treatment in an alkaline electrolyte to form spongy lead and electrolytically treating this spongy lead to form lead peroxid.

VICTOR DE KARAVODINE.

Witnesses:
JAMES HENRY BOYD,
CARL R. LOOP.